United States Patent
Willis

(10) Patent No.: US 6,593,796 B1
(45) Date of Patent: Jul. 15, 2003

(54) METHOD AND APPARATUS FOR POWERING MULTIPLE AC LOADS USING OVERLAPPING H-BRIDGE CIRCUITS

(75) Inventor: Kendall Willis, Mountain View, CA (US)

(73) Assignee: Sipex Corporation, Billerica, MA (US)

( * ) Notice: Subject to any disclaimer, the term of this patent is extended or adjusted under 35 U.S.C. 154(b) by 0 days.

(21) Appl. No.: 09/665,698

(22) Filed: Sep. 20, 2000

(51) Int. Cl.[7] .............................................. H03K 17/56
(52) U.S. Cl. ...................................... 327/424; 327/408
(58) Field of Search ........................... 327/99, 298, 407, 327/408, 423, 424

(56) References Cited

U.S. PATENT DOCUMENTS

| | | | |
|---|---|---|---|
| 4,485,379 A | 11/1984 | Kinoshita et al. | ............ 340/781 |
| 4,830,467 A | 5/1989 | Inoue et al. | ................. 350/333 |
| 4,866,348 A | 9/1989 | Harada et al. | ............ 315/169.3 |
| 4,993,005 A | 2/1991 | Watanabe | .................... 368/226 |
| 5,095,248 A | 3/1992 | Sato | ......................... 315/169.3 |
| 5,592,127 A * | 1/1997 | Mizuno | ........................ 331/57 |
| 5,656,897 A * | 8/1997 | Carobolante et al. | ........ 318/138 |
| 6,008,700 A * | 12/1999 | Pietrzyk | ........................ 331/45 |
| 6,233,396 B1 * | 5/2001 | Kuwada et al. | .............. 318/254 |
| 6,404,658 B1 * | 6/2002 | Reilly | ......................... 363/125 |

* cited by examiner

Primary Examiner—Terry D. Cunningham
Assistant Examiner—Quan Tra
(74) Attorney, Agent, or Firm—Testa, Hurwitz & Thibeault, LLP

(57) ABSTRACT

A circuit to power multiple load elements is presented. Fewer discrete components and fewer output terminals are required to power multiple devices. A single high-power DC boost circuit powers multiple AC devices. An end-user can selectively power a subset of the AC devices electrically connected to the present invention. The circuit includes a first and second reference voltage terminal, and a first, second, and third switch. The circuit also includes a first control switch and a second control switch in electrical communication with the first switch and the second switch, respectively. The first control switch provides either a first control signal or a second control signal to a control terminal of the first switch. Similarly, the second control switch provides either the first control signal or the second control signal to a control terminal of the third switch.

20 Claims, 7 Drawing Sheets

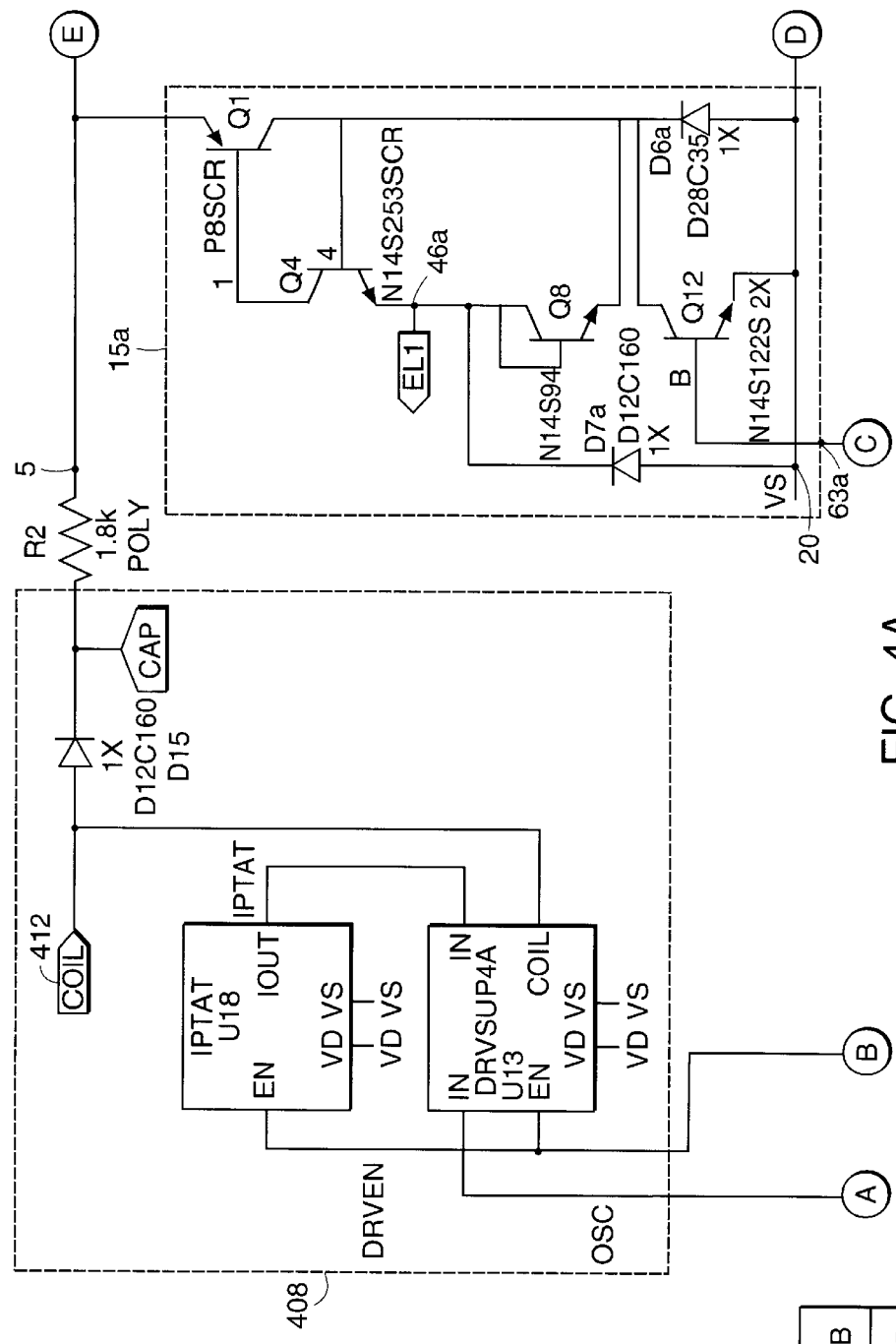

METHOD AND APPARATUS FOR POWERING MULTIPLE AC LOADS USING OVERLAPPING H-BRIDGE CIRCUITS

FIELD OF THE INVENTION

The present invention relates generally to circuits that power load devices, and in particular to circuits that supply load devices with AC voltages derived from DC sources.

BACKGROUND OF THE INVENTION

There are two types of electrical power. Direct current (DC) electrical power is characterized by its constant voltage and current. This is the type of power delivered, for example, by electrical storage cells, chemical batteries, and photovoltaic devices. Although typically used to power electrical devices, resistive losses proportionate to the square of its amperage render it undesirable for long-range power transmission.

Alternating current (AC) electrical power is typically characterized by time-varying voltage and current values whose time-average values are typically zero. Typically, its resistive losses are much smaller than those incurred through the transmission of DC power and therefore it is the power of choice for long-range power transmission. However, its varying voltage and current renders it unsuitable to power devices designed around logic levels that correspond to constant voltage levels. Therefore, most digital logic circuits are designed and operate on DC power.

However, certain circuit components, like electroluminescent panels and electrical motors, require AC power to operate due to design or device characteristics. Therefore, circuit designers are often faced with the problem of converting a supplied DC voltage to an AC voltage to power these devices. Additionally, certain equipment can have multiple loads which require separate control. For example, some cellular phones and personal digital assistants include multiple electroluminescent components and/or piezoelectric transducers which require separate power control. It is desirable to use a single DC power supply with minimal circuit components to individually control power to the loads of such devices.

SUMMARY OF THE INVENTION

The present invention relates to a circuit and method for powering AC devices using DC voltage sources. The present invention provides an improved circuit that requires fewer discrete components to power multiple devices. The circuit enables a user to selectively power a subset of the AC devices electrically connected to the present invention. The present invention also enables a user to switch the direction of the current flow through multiple load devices while reducing the number of components.

In one aspect, the invention relates to a circuit for driving multiple load elements. The circuit includes a first reference voltage terminal and a second reference voltage terminal. The circuit also includes a first, second, and third switch, each having an output terminal. The circuit also includes a first control switch in electrical communication with the first switch. The first control switch provides either a first control signal or a second control signal to a control terminal of the first switch. The circuit further includes a second control switch in electrical communication with the third switch. The second control switch provides either the first control signal or the second control signal to a control terminal of the third switch. The output terminal of the first switch is coupled to the first reference voltage terminal when the first control signal is in a first state. The output terminal of the first switch is coupled to the second reference voltage terminal when the first control signal is in a second state. Similarly, the output terminal of the third switch is coupled to the first reference voltage terminal when the second control signal is in a first state. The output terminal of the third switch is coupled to the second reference voltage terminal when the second control signal is in a second state.

In one embodiment, the first control switch has a selection terminal. A first selection signal applied to the selection terminal of the first control switch determines whether the first control switch provides the first control signal or the second control signal to the control terminal of the first switch. In a further embodiment, the second control switch also has a selection terminal. A second selection signal applied to the selection terminal of the second control switch determines whether the second control switch provides the first control signal or the second control signal to the control terminal of the third switch.

In another aspect, the invention relates to a method for powering multiple load elements. The method includes the step of providing a first load and a second load, each having a first load terminal and a second load terminal. The second load terminal of the first load is electrically coupled to the first load terminal of the second load. The method also includes the steps of selecting a power state or an off state for each load device and applying a first reference voltage to the second load terminal of the first load. The method includes the additional step of applying a second reference voltage to the first load terminal of the first load if the power state is selected for the first load. If the power state is selected for the second load, the second reference voltage is applied to the second load terminal of the second load. If the off state is selected for the first load, the first reference voltage is applied to the first load terminal of the first load. Similarly, if the off state is selected for the second load, the first reference voltage is applied to the second load terminal of the second load.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION OF THE INVENTION

Figure 1:
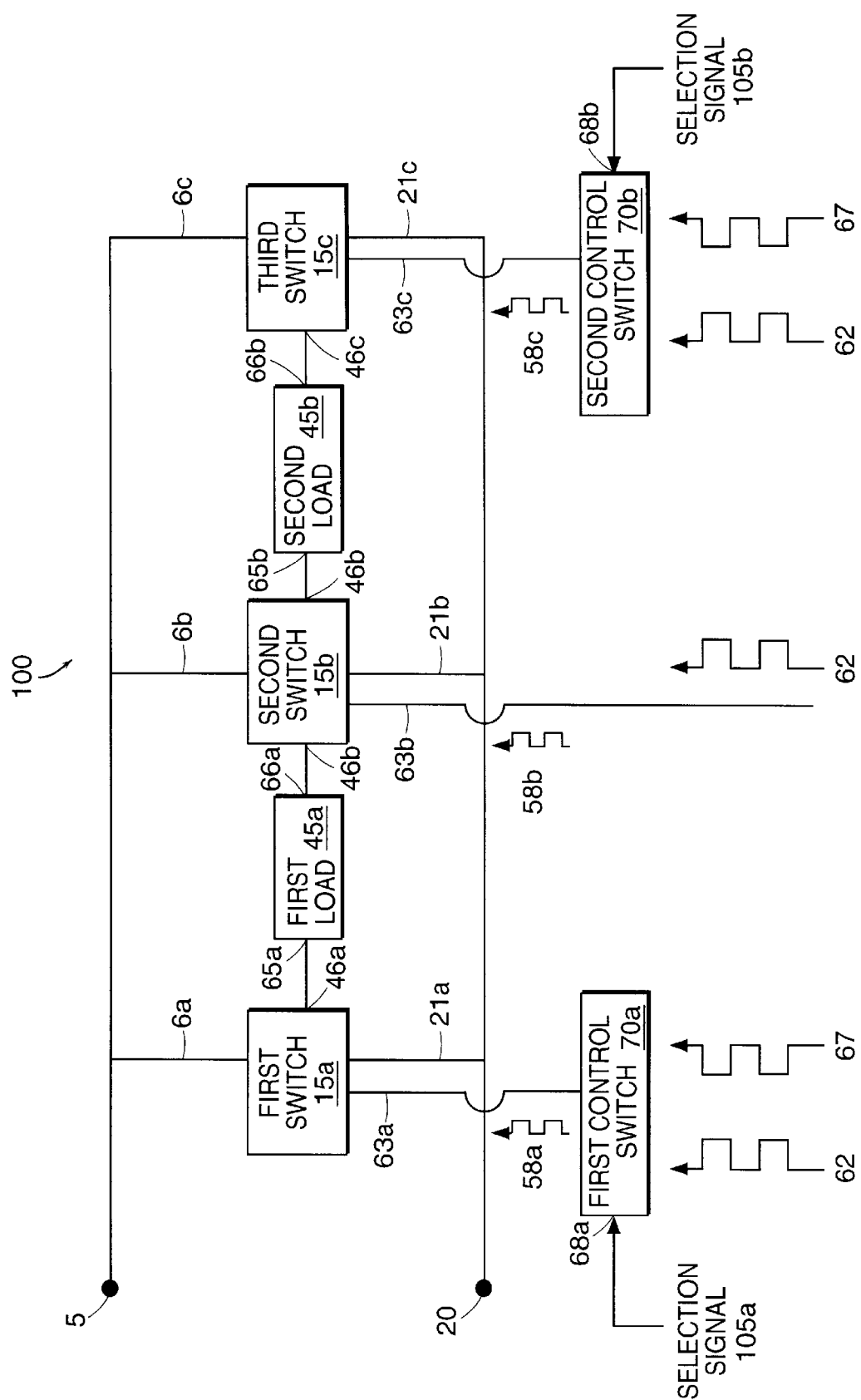
FIG. 1 is a highly schematic block diagram depicting an embodiment of the invention.

As an overview and referring to FIG. 1, a circuit 100 for selectively powering AC load devices using a DC source includes a first reference voltage terminal 5 to receive a first voltage and a second reference voltage terminal 20 to receive a second voltage. The first reference voltage terminal 5 is connected to a first input terminal 6a, 6b, 6c of a first switch 15a, a second switch 15b, and a third switch 15c, respectively (generally 15). The second reference terminal 20 is connected to a second input terminal 21a, 21b, 21c of each switch 15a, 15b, 15c, respectively. In one embodiment, each switch 15 is a single-pole double-throw (SPDT) switch.

A first load 45a is connected between an output terminal 46a of the first switch 15a and an output terminal 46b of the second switch 15b. A second load 45b is connected between the output terminal 46b of the second switch 15b and an output terminal 46c of the third switch 15c. The configuration of the output terminals 46a, 46b, and 46c (generally 46) of the switches 15a, 15b, 15c, respectively, with the corresponding loads 45a, 45b generally 45) are referred to as H-bridges. Whereas conventional methods use a separate H-bridge for each load device 45, the present invention utilizes H-bridges that share a common leg. In FIG. 1, for example, this common leg includes the second switch 15b. In one embodiment, the load devices 45 are electroluminescent (EL) lamps.

A first control switch 70a transmits a first input control signal 58a, which in one embodiment is either a first control signal 62 (e.g., clock signal) or a second control signal 67 (e.g., complementary clock signal), to a control terminal 63a of the first switch 15a. Optionally, the clock signals 62, 67 can be replaced by other forms of switching signals. The first input to control signal 58a causes the voltage provided at the output terminal 46a of the first switch 15a to alternate between the first voltage and the second voltage. The clock signal 62 is applied as a second input control signal 58b to a control terminal 63b of the second switch 15b. A second control switch 70b transmits a third input control signal 58c, which is either the first control signal 62 or the second control signal 67, to a control terminal 63c of the third switch 15c. The third input control signal 58c causes the voltage provided at the output terminal 46c of the third switch 15c to alternate between the first voltage and the second voltage.

A first selection signal 105a is applied to a selection terminal 68a of the first control switch 70a and controls the operation of the first control switch 70a. A second selection signal 105b is applied to a selection terminal 68b of the second control switch 70b and controls the operation of the second control switch 70b. When the first selection signal 105a is deasserted, the first control switch 70a applies the first control signal 62 to the control terminal 63a of the first switch 15a. Thus, the same control signal 62 is applied to the control terminals 63a, 63b of the first and second switches 15a, 15b, respectively. In an embodiment in which the same first control signal 62 causes the first switch 15a and the second switch 15b to connect their respective output terminals 46a, 46b to the same reference voltage terminal 5, 20, no voltage difference exists between the two load terminals 65a, 66a of the first load 45a and no power is delivered to the first load 45a.

In another embodiment, the first switch 15a connects its output terminal 46a to one reference voltage terminal 5, 20 in response to the first control signal 62 being applied to the control terminal 63a of the first switch 15a and the second switch 15b connects its output terminal 46b to the other reference voltage terminal 5, 20 in response to the first control signal 62 being applied to the control terminal 63b of the second switch 15b. Thus, power is delivered to the first load 45a when the same control signal 62 is applied to the control terminal 63a, 63b of the first and second switches 15a, 15b, respectively, because a voltage difference exists across its two load terminals 65a, 66a of the first load 45a.

When the first selection signal 105a is asserted, the first control switch 70a applies the second control signal 67 to the control terminal 63a of the first switch 15a. In an embodiment in which the second control signal 67 causes the first switch 15a to connect its output terminal 46a to one reference voltage terminal 5, 20 and the first control signal 62 causes the second switch 15b to connect its output terminal 46b to the other reference voltage terminal 5, 20, a voltage difference exists between the two load terminals 65a, 66a of the first load 45a. The voltage applied across the two load terminals 65a, 66a of the first load 45a results in the delivery of power to the first load 45a. In contrast, no voltage difference exists between the two load terminals 65a, 66a of the first load 45a and no power is applied to the first load 45a when the first selection signal 105a is deasserted. Furthermore, if the control signals 62, 67 are maintained out of phase, AC power is delivered to the first load 45a.

Similarly, when the second selection signal 105b is asserted, the second control switch 70b applies the second control signal 67 to the control terminal 63c of the third switch 15c. In an embodiment in which the second control signal 67 causes the third switch 15c to connect its output terminal 46c to one reference voltage terminal 5, 20 and the first control signal 62 causes the second switch 15b to connect its output terminal 46b to the other reference voltage terminal 5, 20, a voltage difference exists between the two load terminals 65b, 66b of the second load 45b and power is applied to the second load 45b. In contrast, no voltage difference exists between the two terminals 65b, 66b of the second load 45b and no power is applied to the second load 45b when the second selection signal 105b is deasserted. If the control signals 62, 67 are maintained out of phase, AC power is delivered to the second load 45b. The principle discussed above can be extended to any number of loads which have one load terminal connected to the output terminal 46b of the second switch 15b.

Figure 2:
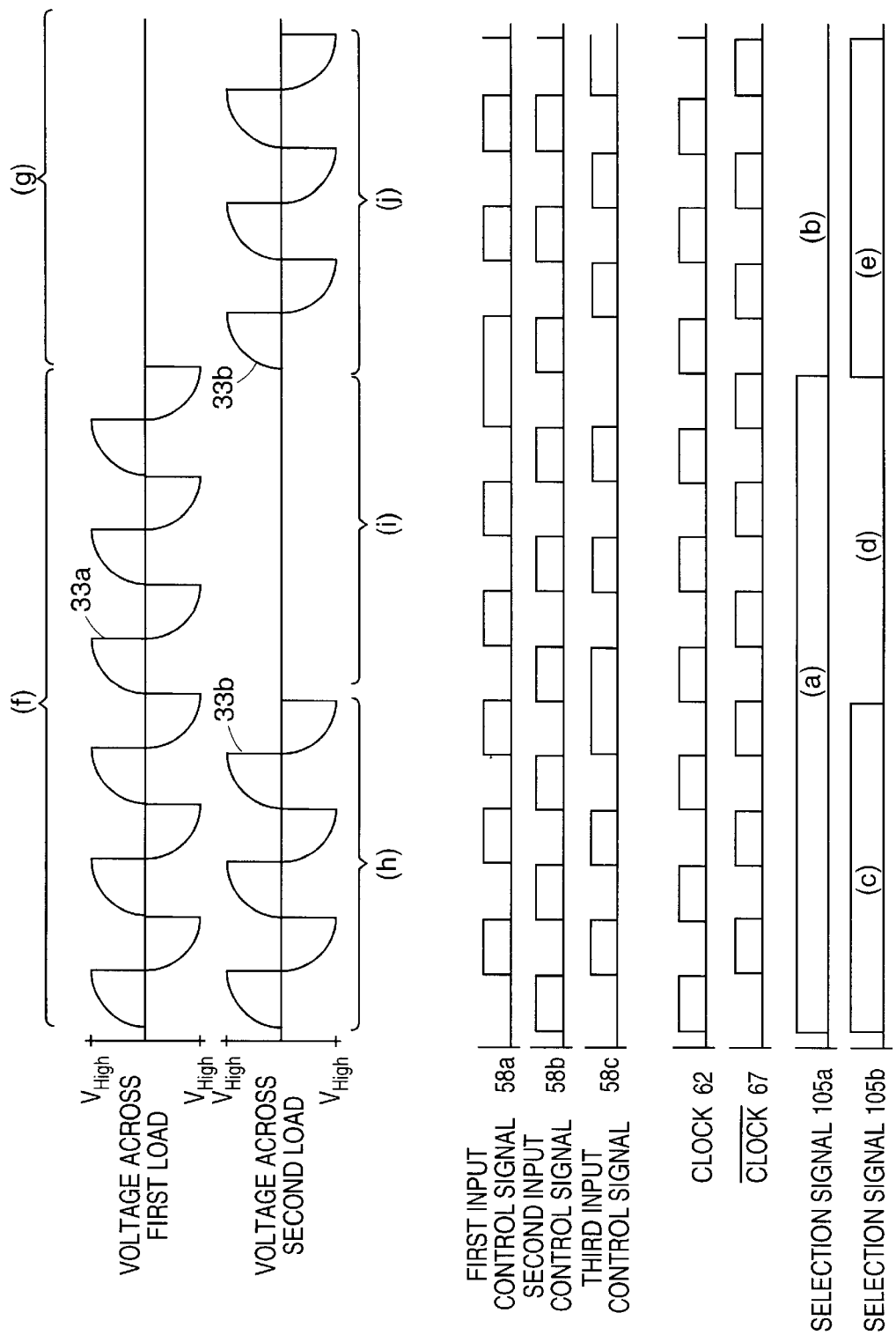
FIG. 2 is a signal diagram showing the operation of the embodiment of FIG. 1.

FIG. 2 depicts the signal inputs and the resulting outputs for the circuit 100 of FIG. 1 for several clock cycles. The input control signals 58a, 58b, and 58c are shown for reference. The selection signals 105a and 105b determine whether the clock signal 62 (e.g., clock) or the complementary clock signal 67 (e.g., $\overline{\text{clock}}$) is transmitted through the control switch 70a and 70b, respectively, as the first and third input control signals 58a and 58c, respectively. In one embodiment in which the first selection signal 105a is in a high state (a), the first control switch 70a transmits $\overline{\text{clock}}$ as the first input control signal 58a to the control terminal 63a of the first switch 15a. As described above, the clock signal 62 is transmitted as the second input control signal 58b to the control terminal 63b of the second switch 15b.

When the $\overline{\text{clock}}$ is transmitted as the first input control signal 58a to the control terminal 63a of the first switch 15a, the voltage applied at the first load terminal 65a is out of phase with respect to the voltage applied at the second load terminal 66a of the first load 45a, resulting in a voltage difference across the first load 45a. Consequently, power is delivered to the first load 45a. As the voltage of each clock signal 62 and 67 alternates, the polarity of the voltage difference between the first load terminal 65a and the second load terminal 66a of the first load 45a alternates, resulting in the delivery of AC power. This is shown as section (f) of the voltage 33a.

If the first selection signal 105a is switched to a low state (b), the first input control signal 58a is substantially the same as the clock signal 62. Consequently, the voltage applied to both load terminals 65a, 66a of the first load 45a is in phase and the same and therefore no voltage difference is present between the first load terminal 65a and the second load terminal 66a of the first load 45a. Thus, no power is delivered to the first load 45a. This is shown as section (g) of the voltage 33a.

Similarly, when the second selection signal 105b for the second load 45b is in a high state (c) and (e), $\overline{\text{clock}}$ is transmitted as the third input control signal 58c to the control terminal 63c of the third switch 15c. This causes power to be applied between the first load terminal 65b and the second load terminal 66b of the second load 45b, as shown as sections (h) and (j) of the voltage 33b. When the second selection signal 105b is in a low state (d), no power is applied to the second load 45b, as shown in section (i) of the voltage 33b.

Figure 3:
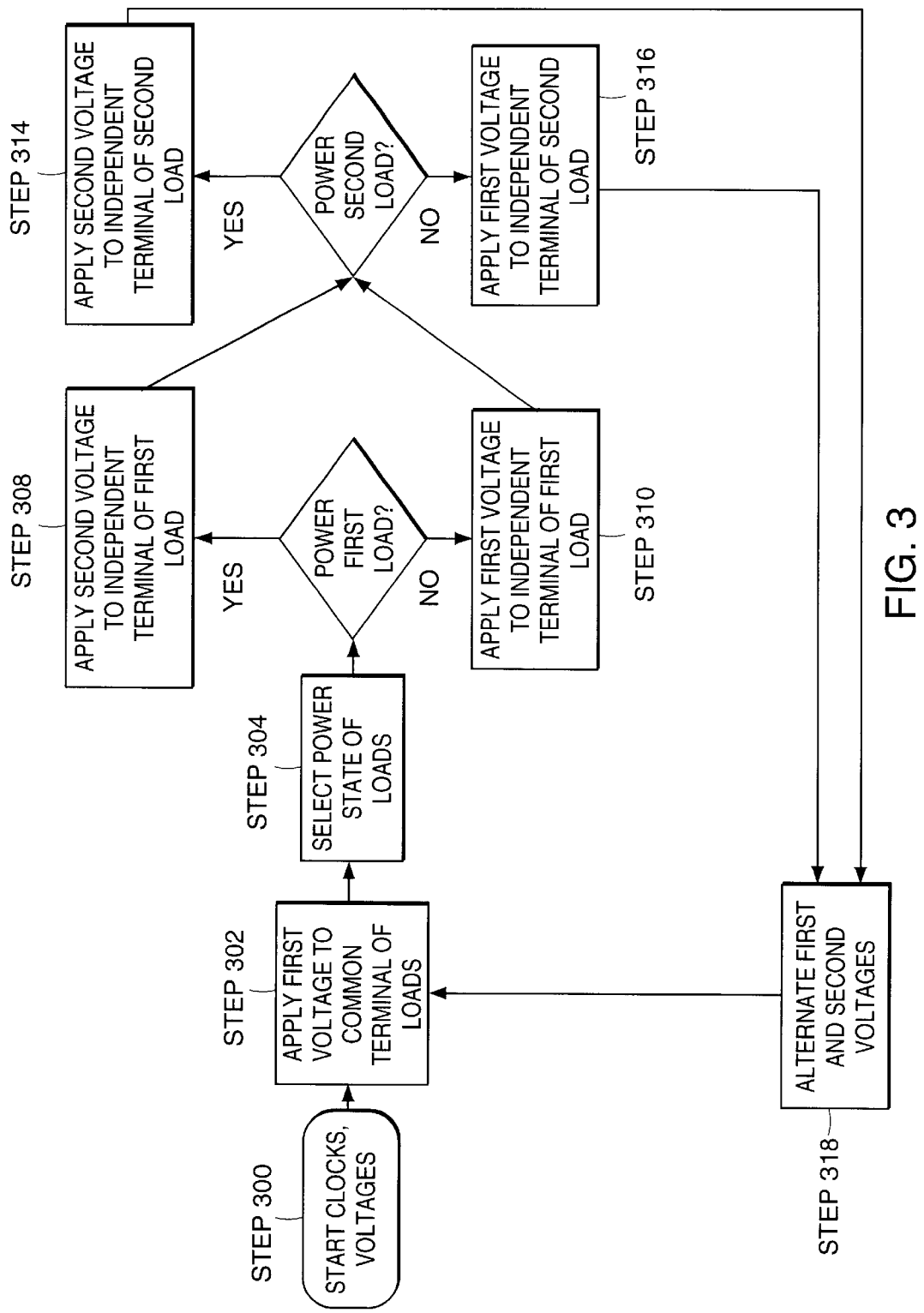
FIG. 3 is a flowchart describing an embodiment of a method of using the invention.
Figure 4B:
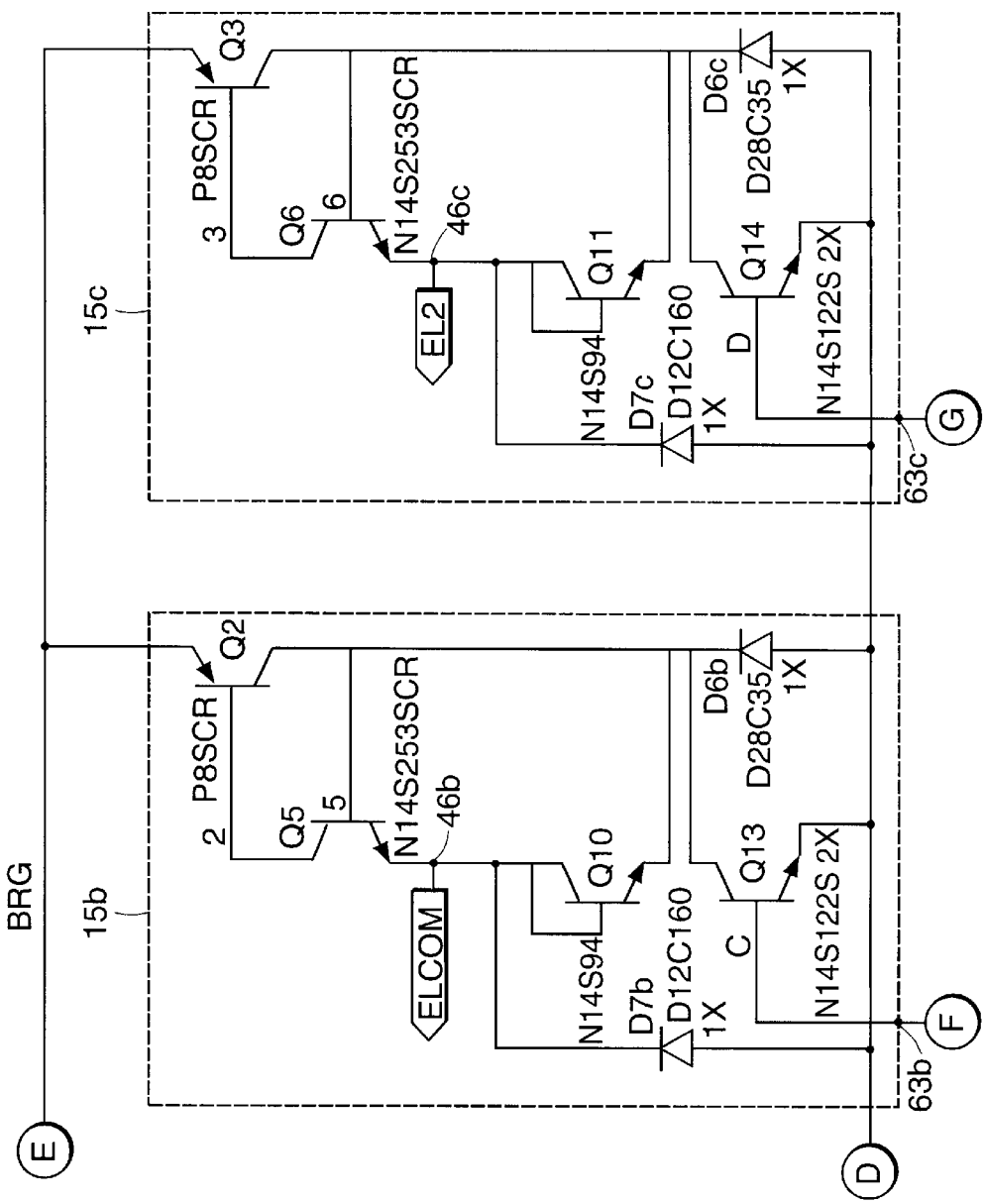
FIG. 4 is a schematic diagram of an embodiment of the invention.
Figure 4C:
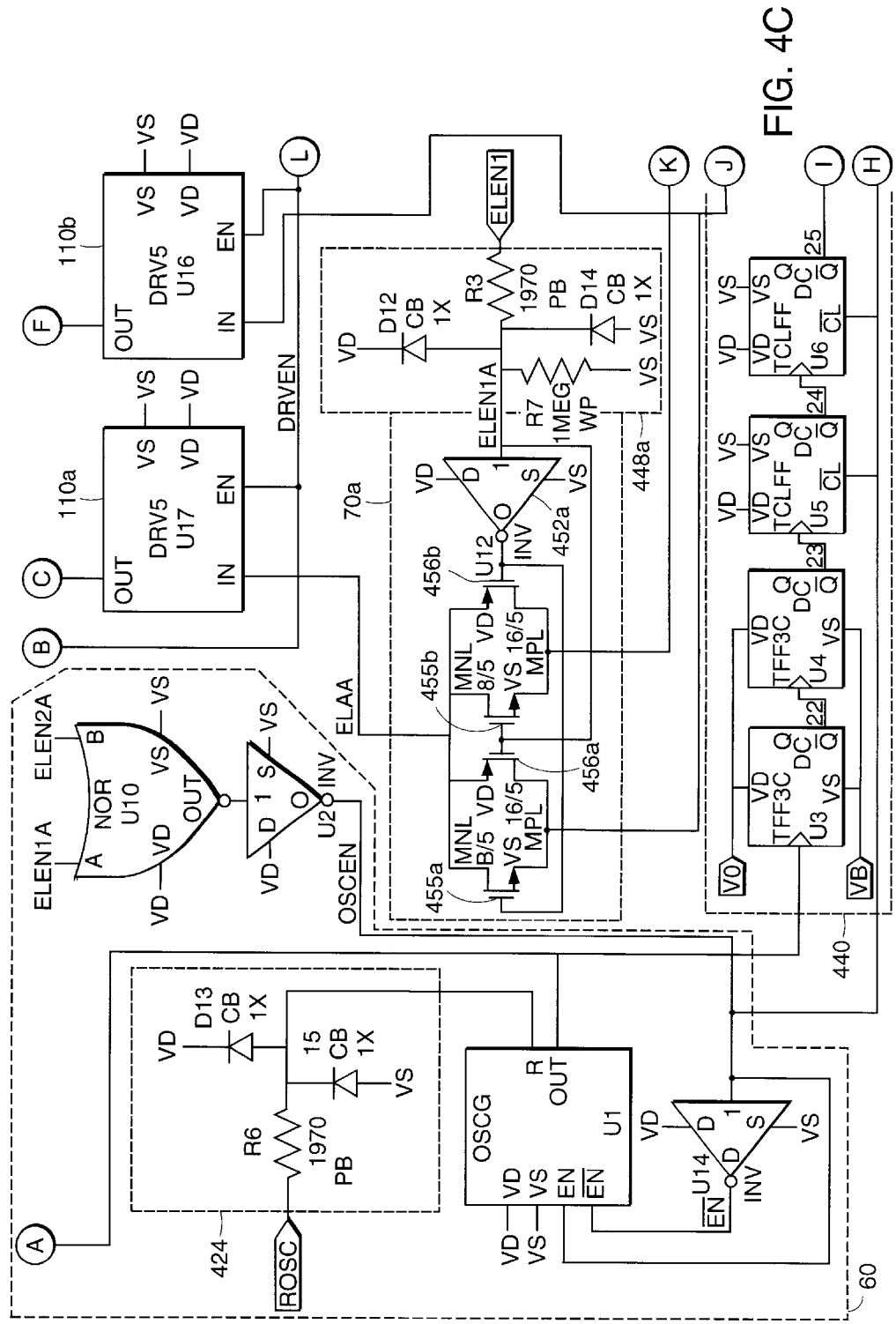
Figure 4D:
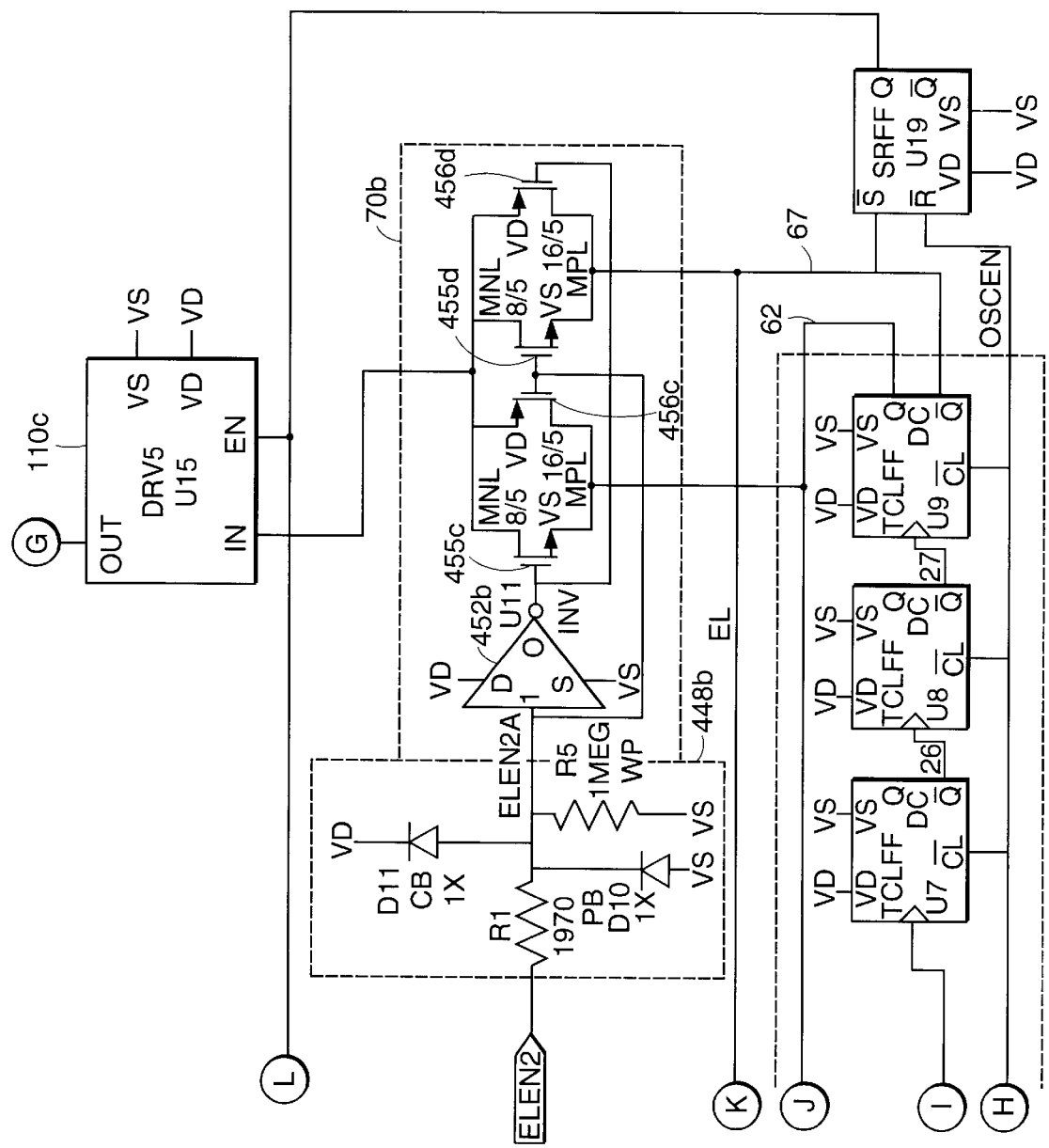

The flowchart of FIG. 3 depicts a method for powering two load devices according to one embodiment of the invention. The circuit with the two loads is initialized (step 300), which includes establishing control (e.g., clock) signals and reference voltages. The method also includes applying (step 302) a first voltage to the common terminal of the loads, thereby applying the first voltage to the second load terminal of the first load and the first load terminal of the second load. A power state (i.e., ON state or OFF state) is then independently selected (step 304) for the first and second loads. As described above, power is applied to a load device when a voltage difference exists between the first load terminal and the second load terminal of the load device. If an ON state was selected for the first load in step 304, a second voltage is applied (step 308) to the independent load terminal of the first load. Because the first voltage is applied in step 302 to the common terminal of the two load devices, a voltage difference exists across the first and second load terminals of the first load device and power is applied to the first load device. However, if an OFF state is selected in step 304 for the first load device, the first voltage is applied (step 310) to the first load terminal of the first load device. Because the first voltage is applied in step 302 to the common terminal of the two load devices, no voltage difference exists across the first and second load terminals of the first load device. Therefore, no power is applied to the first load device.

Similarly, if an ON state is selected in step 304 for the second load device, the second voltage is applied (step 314) to the second load terminal of the second load device. Because the first voltage is applied in step 302 to the common terminal of the two loads, a voltage difference exists between the first and second load terminals of the second load device. Therefore, power is applied to the second load device. However, if an OFF state is selected in step 304 for the second load device, the first voltage is applied (step 316) to the second load terminal of the second load device. Therefore, no voltage difference exists between the first and second load terminals of the second load device and no power is applied to the second load device. The steps of the method are repeated with the phase of the voltages applied to each load being reversed (step 318).

FIGS. 4A, 4B, 4C, and 4D are sections of a schematic diagram of an embodiment of a detailed circuit for powering the first and second loads 45a, 45b (not shown). The detailed circuit includes the first switch 15a, the second switch 15b, the third switch 15c, the first control switch 70a, and the second control switch 70b. Each control switch 70a and 70b includes an electrostatic discharge (ESD) protection circuit 448a and 448b, respectively. Drivers 110a, 110b, and 110c provide the correct level input control signals 58a, 58b, and 58c, respectively, to the control terminal 63a, 63b, and 63c, respectively, of the switch 15a, 15b, and 15c, respectively. A high voltage boost circuit 408 is used to generate the voltage applied across the first reference voltage terminal 5 and the second reference voltage terminal 20. A clock generator 60 produces a high frequency clock signal and also includes an ESD protection circuit 424. The high frequency clock signal is provided to a frequency divider 440. The frequency divider 440 reduces (i.e., divides) the frequency of the high frequency clock signal by a predetermined scale factor to produce the clock signal 62 and the complementary clock signal 67.

The first and second load terminals 65a and 66b of the first load 45a are coupled to the output terminal 46a of the first switch 15a and the output terminal 46b of the second switch 15b, respectively. The first and second load terminals 65b and 66b of the second load 45b are coupled to the output terminal 46b of the second switch 15b and the output terminal 46c of the third switch 15c, respectively. Because the second load terminal 66a of the first load 45a and the first load terminal 65b of the second load 45b are coupled together, the output terminal 46b (ELCOM) of the second switch 15b forms a common terminal to the first and second loads 45a and 45b.

The first switch 15a includes a four transistor network having transistors Q1, Q4, Q8, and Q12. The transistors Q1 and Q4 form a first sub-switch and the transistors Q8 and Q12 form a second sub-switch to permit rapid switching between the first and second reference voltages. If a positive voltage is applied to the control terminal 63a, 63b, 63c (generally 63) of the respective switch 15, and consequently to the base of Q12, current flows through the collector of Q12. As a result, the top transistor Q1 is connected to the second reference voltage terminal 20. Transistor Q8 is configured as a diode. When a positive voltage is applied to the Q12 base, the second sub-switch formed from transistors Q8 and Q12 connects the second reference voltage terminal 20 to the output terminal 46 of the switch 15.

If substantially no voltage is applied to the control terminal 63 and consequently the base of Q12, then no current flows through the collector of Q12 and the Q12 transistor is in an "off" state. As a result, the transistor Q4 is in an "on" state because a positive voltage is applied to the base of Q4. Therefore, if a voltage transient is generated at coil terminal 412, transistor Q1 is changed to an "on" state. Current flows through the collector of the Q1 transistor into the base of the Q4 transistor to turn the Q4 transistor to an "on" state. As a result, the transistor Q1 turns to the "on" state more rapidly because current flows through the Q4 collector and into the Q1 base. The second switch 15b includes the four transistors Q2, Q5, Q10, and Q13 and the third switch 15c includes the four transistors Q3, Q6, Q11, and Q14, which function in a manner similar to the four transistors Q1, Q4, Q8, and Q12 of the first switch 15a.

If the voltages of the clock signal 62 and the complementary clock signal 67 transition, the loads 45a, 45b are discharged to prevent a high negative voltage from occurring at the output terminal 46 of the switch 15. The diodes D7a, D7b, and D7c allow the rapid discharge of the two loads 45a, 45b to prevent the occurrence of the high negative voltage. Similarly, the diodes D6a, D6b, D6c protect the transistors Q4, Q5, and Q6 by preventing a high negative voltage from occurring at their bases.

In further detail, each control switch 70 includes two pairs of MOSFETs. Each pair of MOSFETs includes an n-channel MOSFET 455a, 455b, 455c, 455d (generally 455) and a p-channel MOSFET 456a, 456b, 456c, 456d (generally 456). The gate of each n-channel MOSFET 455 is connected to the gate of the respective p-channel MOSFET 456. The source of each n-channel MOSFET 455 is connected to the drain of the respective p-channel MOSFET 456 and the drain of the n-channel MOSFET 455 is connected to the source of the respective p-channel MOSFET 456. Clock signal 62 is transmitted to the source of the n-channel MOSFET 455a, 455c and the drain of the p-channel MOSFET 456a, 456c. Complementary clock signal 67 is transmitted to the source of the other n-channel MOSFET 455b, 455d and the drain of the p-channel MOSFET 456b, 456d.

Each control switch 70a, 70b also includes an inverter 452a, 452b (generally 452). The inverter 452a causes one pair of MOSFETs 455a, 456a to be in an "on" state when the other pair of MOSFETs 455b, 456b is in an "off" state, thus allowing only one of the control signals 62, 67 to be transmitted by the first control switch 70a to the control terminal 63a of the first switch 15a. Similarly, the inverter 452b causes the MOSFET pair 455c, 456c to be in an "on" state when the other pair of MOSFETs 455d, 456d is in an "off" state, thus allowing only one of the control signals 62, 67 to be transmitted by the second control switch 70b to the control terminal 63c of the third switch 15c.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A circuit for driving multiple load elements comprising:
   a first reference voltage terminal;
   a second reference voltage terminal;
   a first switch having an output terminal for communication with a first terminal of a first load device;
   a second switch having an output terminal for communication with a second terminal of said first load device and a first terminal of a second load device;
   a third switch having an output terminal for communication with a second terminal of said second load device;
   a first control switch in electrical communication with said first switch, said first control switch receiving a first control signal and a second control signal and providing one of said first control signal and said second control signal; and
   a second control switch in electrical communication with said third switch, said second control switch providing one of said first control signal and said second control signal,
   wherein said output terminal of said first switch is coupled to said first reference voltage terminal when said first control signal is in a first state and wherein said output terminal of said first switch is coupled to said second reference voltage terminal when said first control signal is in a second state, and
   wherein said output terminal of said third switch is coupled to said first reference voltage terminal when said second control signal is in a first state and wherein said output terminal of said third switch is coupled to said second reference voltage terminal when said second control signal is in a second state.

2. The circuit of claim 1 wherein said first control switch further comprises a selection terminal to receive a first selection signal, said first control switch providing said first control signal when said first selection signal is in a first state and providing said second control signal when said first selection signal is in a second state.

3. The circuit of claim 2 wherein said second control switch further comprises a selection terminal to receive a second selection signal, said second control switch providing said first control signal when said second selection signal is in a first state and providing said second control signal when said second selection signal is in a second state.

4. The circuit of claim 1 wherein said output terminal of said second switch is coupled to said first reference voltage terminal when a third control signal is in a first state and wherein said output terminal of said second switch is coupled to said second reference voltage terminal when said third control signal is in a second state.

5. The circuit of claim 4 wherein said third control signal is one of said first control signal and said second control signal.

6. A method for selectively powering multiple load elements comprising:
   providing a first load having a first terminal and a second terminal and a second load having a first terminal and a second terminal, said second terminal of said first load being electrically coupled to said first terminal of said second load;
   selecting one of a power state and an off state for each of said first load and said second load;
   applying a first reference voltage to said second terminal of said first load; and
   applying a second reference voltage to said first terminal of said first load and said second terminal of said second load if said power state is selected for said first load and said second load, and
   applying said first reference voltage to said first terminal of said first load and said second terminal of said second load if said off state is selected for said first load and said second load, and
   applying said first reference voltage to one of said first terminal of said first load and said second terminal of said second load and applying said second reference voltage to the other of said first terminal of said first load and said second terminal of said second load if said power state is selected for one of said first load and said second load and said off state is selected for the other of said first load and said second load.

7. A circuit for driving multiple load elements comprising:
   a first clock switch comprising a first clock terminal adapted to receive a first clock signal, a second clock terminal adapted to receive a second clock signal, a first clock switch output terminal, and a first clock switch control terminal adapted to receive a first control signal, wherein said first clock switch provides one of said first clock signal and said second clock signal at said first clock switch output terminal in response to said first control signal;
   a second clock switch comprising a third clock terminal adapted to receive said first clock signal, a fourth clock terminal adapted to receive said second clock signal, a second clock switch output terminal, and a second clock switch control terminal adapted to receive a second control signal, wherein said second clock switch provides one of said first clock signal and said second clock signal at said second clock switch output terminal in response to said second control signal;
   a first switch comprising an output terminal for communication with a first terminal of a first load device, a first reference terminal adapted to receive a first reference voltage, a second reference terminal adapted to receive a second reference voltage, and a first control terminal in electrical communication with said first clock switch output terminal, wherein said first switch applies one of said first reference voltage and said second reference voltage to said output terminal of said first switch in response to one of said first clock signal and said second clock signal applied to said control terminal of said first switch;

a second switch comprising an output terminal for communication with a second terminal of said first load device and a first terminal of a second load device, a first reference terminal adapted to receive said first reference voltage, a second reference terminal adapted to receive said second reference voltage, and a control terminal adapted to receive a reference clock signal, wherein said second switch applies one of said first reference voltage and said second reference voltage to said output terminal of said second switch in response to said reference clock signal; and a third switch comprising an output terminal for communication with a second terminal of said second load device, a first reference terminal adapted to receive said first reference voltage, a second reference terminal adapted to receive said second reference voltage, and a control terminal in electrical communication with said second clock switch output terminal, wherein said third switch applies one of said first reference voltage and said second reference voltage to said output terminal of said third switch in response to one of said first clock signal and said second clock signal applied to said control terminal of said third switch.

8. The circuit of claim 7 wherein said first switch further comprises:

a first sub-switch having a first sub-switch terminal in electrical communication with said output terminal of said first switch, a second sub-switch terminal in electrical communication with said first reference terminal of said first switch and a third sub-switch terminal in electrical communication with said control terminal of said first switch, said first sub-switch applying said first reference voltage to said first sub-switch terminal in response to one of said first clock signal and said second clock signal applied to said third sub-switch terminal.

9. The circuit of claim 7 wherein said first load device is an electroluminescent lamp.

10. A circuit for driving multiple load elements comprising:

a first reference voltage terminal;

a second reference voltage terminal;

a first switch having an output terminal for communication with a first terminal of a first load device, said output terminal of said first switch coupled to said first reference voltage terminal when a first control signal is in a first state, said output terminal of said first switch coupled to said second reference voltage terminal when said first control signal is in a second state;

a second switch having an output terminal for communication with a second terminal of said first load device and a first terminal of a second load device;

a third switch having an output terminal for communication with a second terminal of said second load device, said output terminal of said third switch coupled to said first reference voltage terminal when a second control signal is in a first state, said output terminal of said third switch coupled to said second reference voltage terminal when said second control signal is in a second state; and a first control switch providing said first control signal when a first selection signal is in a first state and said second control signal when said first selection signal is in a second state.

11. The circuit of claim 10 further comprising a second control switch providing said first control signal when a second selection signal is in a first state and said second control signal when said selection signal is in a second state.

12. A circuit for driving multiple load elements comprising:

a first reference voltage terminal;

a second reference voltage terminal;

a first switch having an output terminal for communication with a first terminal of a first load device, said output terminal of said first switch coupled to said first reference voltage terminal when a first control signal is in a first state, said output terminal of said first switch coupled to said second reference voltage terminal when said first control signal is in a second state;

a second switch having an output terminal for communication with a second terminal of said first load device and a first terminal of a second load device; and a third switch having an output terminal for communication with a second terminal of said second load device, said output terminal of said third switch coupled to said first reference voltage terminal when a second control signal is in a first state, said output terminal of said third switch coupled to said second reference voltage terminal when said second control signal is in a second state; and a first control switch in electrical communication with said first switch, said first control switch receiving said first control signal and said second control signal and providing one of said first control signal and said second control signal;

wherein said output terminal of said second switch is coupled to said first reference voltage terminal when a third control signal is in a first state and wherein said output terminal of said second switch is coupled to said second reference voltage terminal when said third control signal is in a second state, and wherein said third control signal is related to at least one of said first control signal and said second control signal.

13. The circuit of claim 12 wherein said third control signal is different than at least one of said first control signal and said second control signal.

14. The circuit of claim 13 wherein said third control signal is out of phase with respect to at least one of said first control signal and said second control signal.

15. The circuit of claim 14 wherein said third control signal is substantially 180 degrees out of phase with respect to at least one of said first control signal and said second control signal.

16. The circuit of claim 12 wherein said third control signal is substantially in phase with respect to at least one of said first control signal and said second control signal.

17. A circuit for driving multiple load elements comprising:

a first reference voltage terminal;

a second reference voltage terminal;

a first switch having an output terminal for communication with a first terminal of a first load device;

a second switch having an output terminal for communication with a second terminal of said first load device and a first terminal of a second load device;

a third switch having an output terminal for communication with a second terminal of said second load device;

a first control switch controlling said first switch to electrically couple said output terminal of said first switch to said first reference voltage terminal when a first control signal is in a first state and to electrically couple said output terminal of said first switch to said second reference voltage terminal when said first control signal is in a second state; and a second control switch controlling said third switch to electrically couple said output terminal of said third switch to said first reference voltage terminal when a second control signal is in a first state and to electrically couple said output terminal of said third switch to said second reference voltage terminal when said second control signal is in a second state, wherein said first control switch further comprises a selection terminal to receive a first selection signal, said first control switch providing said first control signal when said first selection signal is in a first state and providing said second control signal when said first selection signal is in a second state.

18. The circuit of claim 17 wherein said second control switch further comprises a selection terminal to receive a second selection signal, said second control switch providing said first control signal when said second selection signal is in a first state and providing said second control signal when said second selection signal is in a second state.

19. A circuit for driving multiple load elements comprising:

a first reference voltage terminal;

a second reference voltage terminal;

a first switch having an output terminal for communication with a first terminal of a first load device;

a second switch having an output terminal for communication with a second terminal of said first load device and a first terminal of a second load device;

a third switch having an output terminal for communication with a second terminal of said second load device;

a first control switch receiving a first control signal and a second control signal and controlling said first switch to electrically couple said output terminal of said first switch to said first reference voltage terminal when said first control signal is in a first state and to electrically couple said output terminal of said first switch to said second reference voltage terminal when said first control signal is in a second state; and a second control switch controlling said third switch to electrically couple said output terminal of said third switch to said first reference voltage terminal when said second control signal is in a first state and to electrically couple said output terminal of said third switch to said second reference voltage terminal when said second control signal is in a second state, wherein said output terminal of said second switch is coupled to said first reference voltage terminal when a third control signal is in a first state and wherein said output terminal of said second switch is coupled to said second reference voltage terminal when said third control signal is in a second state.

20. The circuit of claim 19 wherein said third control signal is one of said first control signal and said second control signal.

* * * * *

UNITED STATES PATENT AND TRADEMARK OFFICE
CERTIFICATE OF CORRECTION

PATENT NO. : 6,593,796 B1 Page 1 of 1
DATED : July 15, 2003
INVENTOR(S) : Willis It is certified that error appears in the above-identified patent and that said Letters Patent is hereby corrected as shown below:

Column 10,
Line 22, delete "and".

Signed and Sealed this

Seventh Day of October, 2003

JAMES E. ROGAN
*Director of the United States Patent and Trademark Office*